(12) United States Patent
Bang et al.

(10) Patent No.: US 8,781,335 B2
(45) Date of Patent: Jul. 15, 2014

(54) OPTICAL REPEATER AND SIGNAL RELAY METHOD THEREOF

(75) Inventors: Young Jo Bang, Daejeon (KR); Youn Ok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 196 days.

(21) Appl. No.: 13/536,949

(22) Filed: Jun. 28, 2012

(65) Prior Publication Data

US 2013/0004185 A1 Jan. 3, 2013

(30) Foreign Application Priority Data

Jun. 30, 2011 (KR) .................. 10-2011-0064861
Jun. 25, 2012 (KR) .................. 10-2012-0068156

(51) Int. Cl.
*H04B 10/00* (2013.01)

(52) U.S. Cl.
USPC ............ 398/173; 398/118; 398/126; 398/128

(58) Field of Classification Search
USPC ........... 398/67, 69–72, 76, 89, 118, 126–128, 398/135, 173, 175–177; 455/19
See application file for complete search history.

(56) References Cited

U.S. PATENT DOCUMENTS

| | | | | |
|---|---|---|---|---|
| 7,079,779 B2* | 7/2006 | Kawamura | ............ | 398/173 |
| 7,209,663 B2* | 4/2007 | Lee | ............ | 398/115 |
| 7,542,504 B2* | 6/2009 | Chang et al. | ............ | 375/132 |
| 8,060,115 B2* | 11/2011 | Hwang et al. | ............ | 455/456.2 |
| 2009/0186645 A1* | 7/2009 | Jaturong et al. | ............ | 455/507 |
| 2011/0194520 A1* | 8/2011 | Akimoto et al. | ............ | 370/329 |
| 2014/0050144 A1* | 2/2014 | Ma et al. | ............ | 370/315 |

FOREIGN PATENT DOCUMENTS

KR 10-2010-0051302 A 5/2010

* cited by examiner

*Primary Examiner* — Dalzid Singh
(74) *Attorney, Agent, or Firm* — Rabin & Berdo, P.C.

(57) ABSTRACT

An optical repeater in a mobile communication system includes a main hub unit (MHU) and a plurality of repeaters connected to a plurality of access points of the MHU, respectively. Each of the repeaters receives subcarrier information and a signal transmitted from a base station, as optical signals, through the MHU or a different repeater connected thereto, processes only a signal corresponding to a subcarrier allocated to a terminal which has accessed according to the subcarrier information, and transmits the processed signal to the terminal which has accessed. Also, each of the repeaters maps a signal of the terminal which has accessed to a subcarrier allocated to the terminal which has accessed, and transmits the same to the MHU or a different repeater connected thereto.

20 Claims, 9 Drawing Sheets

FIG. 2
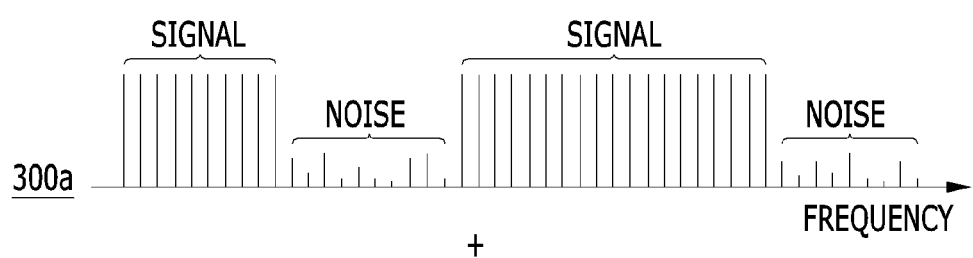
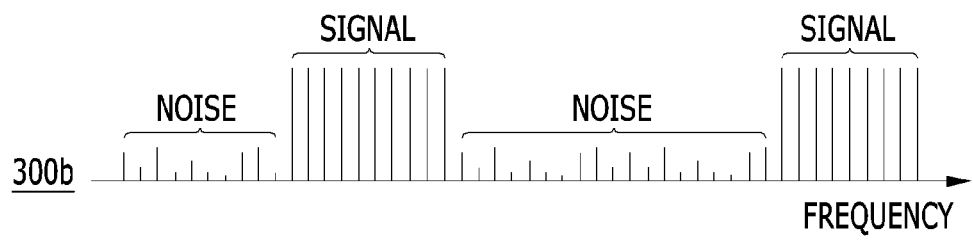

OPTICAL REPEATER AND SIGNAL RELAY METHOD THEREOF

CROSS-REFERENCE TO RELATED APPLICATION

This application claims priority to and the benefit of Korean Patent Application Nos. 10-2011-0064861 and 10-2012-0068156 filed in the Korean Intellectual Property Office on Jun. 30, 2011 and Jun. 25, 2012, the entire contents of which are incorporated herein by reference.

BACKGROUND OF THE INVENTION (a) Field of the Invention

The present invention relates to an optical repeater and a signal relay method (or a signal repeating method) thereof, and more particularly, to an optical repeater in a mobile communication system using orthogonal frequency division multiplexing (OFDM) and a signal relay method thereof.

(b) Description of the Related Art

In a mobile communication system, a repeater is installed to provide a service to a service unavailable terminal located in a shadow area or enhance a data transfer rate.

Mobile communication standard technologies such as WIMAX or LTE currently employ orthogonal frequency division multiplexing (OFDM) as a modulation scheme. Thus, a repeater technique which is able to effectively relay or repeat a signal in a mobile communication system using OFDM modulation is required.

A related art optical repeater in a mobile communication system may be classified into an analog type of optical repeater and a digital type of optical repeater. The analog type of optical repeater transmits and receives a radio frequency (RF) signal through an optical line, having a disadvantage in that performance is degraded according to an optical transmission distance, while the digital type of optical repeater digitizes a baseband signal and optically transmits the same, having an advantage in that there is no degradation of performance according to an optical transmission distance.

A mobile communication system using a digital optical repeater includes a general base station, a main hub unit (MHU) which accesses the base station, and a plurality of optical repeaters installed in remote areas to form service coverage up to a terminal. The MHU includes a plurality of optical access points, and a plurality of repeaters access the respective optical access points.

In forward communication, the MHU directly matches an intermediate frequency (IF) signal transmitted from the base station to a coaxial cable, down-converts the matched IF signal into a baseband signal, performs conversion from an analog signal into a digital signal, and then transmits the converted digital signal into a repeater installed in a shadow area. The repeater converts the digital optical signal received from the MHU into the analog signal, up-converts it into the RF signal, and then transmits the up-converted RF signal to a terminal through a repeater antenna. Also, the repeater transmits the digital optical signal received from the MHU to other repeaters connected thereto.

Also, in backward communication, the repeater down-converts an RF signal received from a terminal through the repeater antenna into a baseband signal, and performs conversion from an analog signal to a digital signal. Here, when there is an optical signal transmitted from a different repeater connected thereto, the repeater adds the signal from the different repeater and the converted digital signal and transmits the resultant signal to the MHU or the different repeater connected thereto. Then, the MHU converts the digital optical signal received from the repeater into the analog signal, up-converts it into an IF signal, and then inputs the up-converted signal to a base station.

In the case of forward communication in the mobile communication system using the digital optical repeater, since all the repeaters transmit signals transmitted from a base station to a different repeater connected thereto, the signals may act as interference to the terminals belonging to different repeaters. Also, in the case of backward communication, since a repeater adds a signal from a terminal within its coverage area and a signal transmitted from a different repeater and transmits it as an optical signal, noise is generated according to multi-hop. For these reasons, relay efficiency of the optical repeater is inevitably degraded.

SUMMARY OF THE INVENTION

The present invention has been made in an effort to provide an optical repeater and a signal relay method thereof having advantages of effectively relaying (or repeating) a signal in a mobile communication system using OFDM modulation.

The present invention has also been made in an effort to provide an optical repeater and a signal relay method thereof having advantages of reducing interference between repeaters and noise according to multi-hop.

An exemplary embodiment of the present invention provides a method of relaying a signal by a repeater in a mobile communication system based on a multi-hop optical repeating scheme. The signal relay method may include: receiving a signal transmitted from a base station and information regarding subcarriers allocated to a plurality of terminals of a region administered by the base station, as optical signals, through a main hub unit (MHU); selecting only a subcarrier allocated to a terminal which has accessed the repeater according to the subcarrier information; and processing a signal corresponding to the selected subcarrier and transmitting the same to the terminal through an antenna.

The signal relay method may further include transmitting the optical signals as is to a different repeater adjacent and connected thereto.

The transmitting may include performing inverse fast Fourier transform on the signal corresponding to the selected subcarrier to convert the same into a signal of a time domain.

The signal relay method may further include: mapping a signal from the terminal to a subcarrier allocated to the terminal according to the subcarrier information; and converting the signal mapped to the subcarrier into an optical signal and transmitting the converted optical signal to the MHU.

The mapping may include: performing fast Fourier transform (FFT) on a signal from the terminal to convert it into a signal of a frequency domain.

The signal relay method may further include receiving an optical signal of a different terminal from a different repeater adjacent and connected thereto. The transmitting may include adding a signal from the different terminal and the signal from the terminal.

Another embodiment of the present invention provides a method for transmitting and receiving a signal to and from a main hub unit (MHU) of a mobile communication system based on a multi-hop optical repeating scheme. The signal transmission and reception method may include: modulating a signal from a base station; receiving information regarding a subcarrier allocated to at least one terminal which has accessed a connected repeater, from the base station; and converting the modulated signal and the subcarrier information into optical signals and transmitting the same to the optical repeater.

The modulating may include: converting the signal from the base station from an analog signal into a digital signal; and performing fast Fourier transform (FFT) on the digital signal to convert it into a signal of a frequency domain.

The signal transmission and reception method may further include: receiving a signal from the terminal, as an optical signal, through the repeater; and processing the optical signal from the terminal and transmitting the same to the base station.

The transmitting to the base station may include: performing inverse FFT (IFFT) on a signal from the terminal to convert it into a signal of a time domain; converting a signal of the time domain from a digital signal into an analog signal; and up-converting the analog signal.

Yet another embodiment of the present invention provides an optical repeater in a mobile communication system based on a multi-hop optical repeating scheme. The optical repeater may include a reception unit and a transmission unit. The reception unit may receive a modulation signal with respect to a signal transmitted from a base station and information regarding subcarriers allocated to a plurality of terminals of an area administered by the base station, as optical signals, through a main hub unit (MHU), process only a signal of a first subcarrier corresponding to a terminal which has accessed any one repeater according to the subcarrier information of the received optical signal, and transmit the processed signal to the any one repeater. The transmission unit may map a signal from the terminal which has accessed the any one repeater to the first subcarrier, convert the signal mapped to the first subcarrier into an optical signal, and transmit the same to the MHU.

The transmission unit may include an optical reception unit configured to receive a signal of a different terminal mapped to a second subcarrier allocated to the different terminal which has accessed an adjacent repeater, and an adder configured to combine the signal mapped to the first subcarrier and the signal mapped to the second subcarrier.

The reception unit may include: an optical reception unit configured to receive the optical signal and convert the received optical signal into a digital signal; a subcarrier selection unit configured to select the signal of the first subcarrier from the digital signal; an inverse fast Fourier transform (IFFT) unit configured to convert the signal of the first subcarrier into a signal of a time domain through IFFT; a digital-to-analog conversion unit configured to convert the signal of the time domain into an analog signal; and an up-conversion unit configured to up-convert the analog signal and transmit the same to the terminal which has accessed the any one repeater through an antenna.

The transmission unit may include: a down-conversion unit configured to down-convert a signal from the terminal; an analog-to-digital conversion unit configured to convert the down-converted signal into a digital signal; an FFT unit configured to convert the digital signal into a signal of a frequency domain through FFT; a subcarrier selection unit configured to map the signal of a frequency domain to the first subcarrier; and an optical transmission unit configured to convert the signal mapped to the first subcarrier into an optical signal.

Still another embodiment of the present invention provides an optical repeater in a mobile communication system based on a multi-hop optical repeating scheme. The optical repeater may include a transmission unit and a reception unit. The transmission unit may modulate a signal from a base station, convert information regarding a subcarrier allocated to at least one terminal which has accessed a repeater and the modulated signal into optical signals, and transmit the same to the repeater. The reception unit may receive a signal of the terminal, as an optical signal, through the repeater, process the received optical signal, and transmit the processed signal to the base station.

The transmission unit may include: a down-conversion unit configured to down-convert a signal from the base station; an analog-to-digital conversion unit configured to convert the down-converted signal into a digital signal; an FFT unit configured to convert the digital signal into a signal of a frequency domain through FFT; and an optical transmission unit configured to convert the signal of a frequency domain into an optical signal and transmit the converted optical signal to the repeater.

The optical transmission unit may receive the subcarrier information from the base station and convert the signal of a time domain and the subcarrier information into the optical signals.

The reception unit may include: an optical reception unit configured to receive the optical signal through the repeater and convert the received optical signal into a digital signal; an IFFT unit configured to convert the digital signal into a signal of a time domain through IFFT; a digital analog conversion unit configured to convert the signal of a time domain into an analog signal; and an up-conversion unit configured to up-convert the analog signal and transmit the up-converted signal to the base station.

BRIEF DESCRIPTION OF THE DRAWINGS

FIG. 2 is a view showing an example of noise according to multi-hop which may be generated in a repeater of the mobile communication system using the multi-hop optical repeating scheme.

DETAILED DESCRIPTION OF THE EMBODIMENTS

Figure 1:
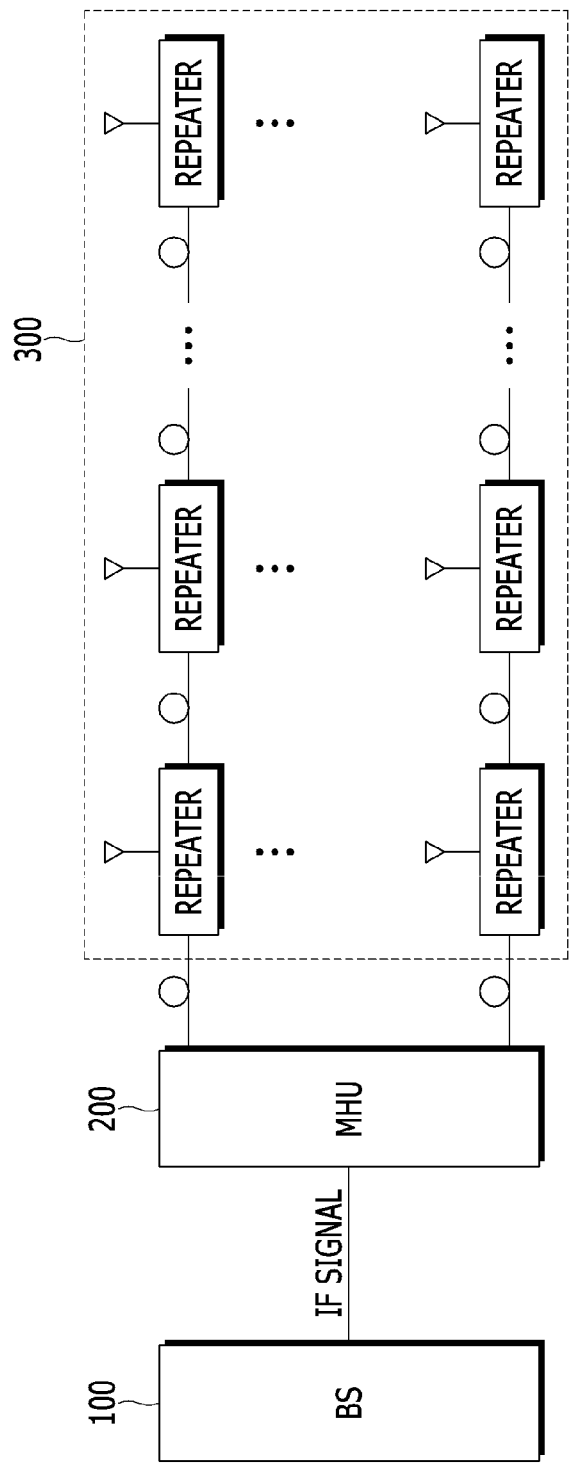
FIG. 1 is a view showing a mobile communication system using a multi-hop optical repeating scheme according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

An optical repeater and a signal relay method (or a signal repeating method) thereof according to embodiments of the present invention will be described in detail with reference to the accompanying drawings.

FIG. 1 is a view showing a mobile communication system using a multi-hop optical repeating scheme according to an embodiment of the present invention.

With reference to FIG. 1, a mobile communication system using a multi-hop optical repeating scheme includes a base station (BS) 100, a main hub unit (MHU) 200 which accesses the BS 100, and a plurality of repeaters 300. Here, the MHU 200 and the plurality of repeaters 300 constitute an optical repeater.

The BS 100 wirelessly transmits and receives a radio frequency (RF) signal to and from a terminal.

The MHU 200 accesses the BS 100 and is connected to the plurality of repeaters 300 through optical lines. The MHU 200 has a plurality of optical access points (APs) which can be connected to the plurality of repeaters 300 through optical lines, and the plurality of repeaters 300 which communicate in a multi-hop manner are connected to the respective APs through the optical lines. The optical lines may be, for example, coaxial cables.

In forward communication, the MHU 200 converts an RF signal received from the BS 100 into a plurality of optical signals, and outputs the plurality of optical signals through the respective optical APs. In backward communication, the MHU 200 converts optical signals received from the plurality of repeaters 300 into RF signals and transmits the RF signals to the BS 100.

The plurality of repeaters 300 are connected to the respective optical APs of the MHU 200 through optical lines, and communicate with a different repeater connected thereto in a multi-hop manner. Namely, at least one repeater 300 is connected between one optical AP and a terminal. The respective repeaters 300 relay a signal to a terminal locating within their coverage, and transmit a signal from the terminal to the MHU 200.

FIG. 2 is a view showing an example of noise according to multi-hop which may be generated in a repeater of the mobile communication system using the multi-hop optical repeating scheme.

In case of the mobile communication system using the multi-hop optical repeating scheme, each repeater adds the signal received from the terminal within its coverage and the signal received from an adjacent different repeater, and transmits the same to the MHU or a different repeater adjacent to the MHU. Here, when a signal of any one repeater 300a and a signal of a different repeater 300b are added, noise included in the signal of the repeater 300a affects the signal of the different repeater 300b, and noise included in the signal of the repeater 300b affects the signal of the repeater 300a.

Also, in the mobile communication system using the multi-hop optical repeating scheme, every repeater 300 transmits a signal transmitted from the BS 100 to different repeaters connected thereto, and the signals act as interference to terminals belonging to different repeaters.

Thus, the repeaters 300 in the mobile communication system using the multi-hop optical repeating scheme require a signal relay technique capable of reducing interference between repeaters and noise according to multi-hop communication. Hereinafter, an optical repeater and a signal relay method thereof capable of reducing interference between repeaters and noise according to multi-hop communication will be described.

Figure 3:
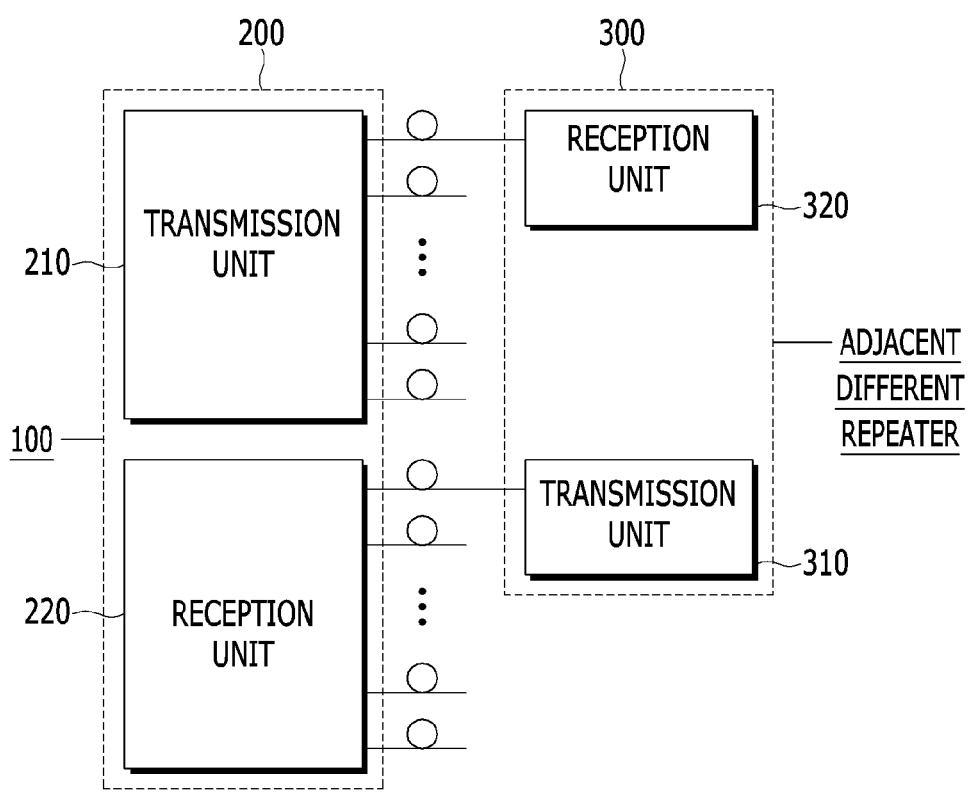
FIG. 3 is a view schematically showing a main hub unit (MHU) and a repeater according to an embodiment of the present invention.

FIG. 3 is a view schematically showing a main hub unit (MHU) and a repeater according to an embodiment of the present invention, in which a single repeater 300 directly connected to a single MHU 200 is illustrated for the sake of explanation.

With reference to FIG. 3, the MHU 200 includes a transmission unit 210 and a reception unit 220, and the repeater 300 also includes a transmission unit 310 and a reception unit 320.

In forward communication, the transmission unit 210 of the MHU 200 matches a signal from the BS 100 to an optical line and transmits the same to the repeater 300, and the reception unit 320 of the repeater 300 converts a signal received through an optical signal into an RF signal and transmits the converted RF signal to a terminal present within its coverage, and transmits a signal from the MHU 200 received through an optical line to a different repeater as it is.

In backward communication, the transmission unit 310 of the repeater 300 matches an RF signal from a terminal to an optical line and transmits the same to the MHU 200. Here, when a signal is received from an adjacent repeater, the transmission unit 310 of the repeater 300 matches the signal received from the adjacent repeater along with the RF signal from the terminal to an optical line. The MHU 200 converts a signal received from the repeater 300 through an optical line into an IF or RF signal, and transmits the converted signal to the BS 100.

Figure 4:
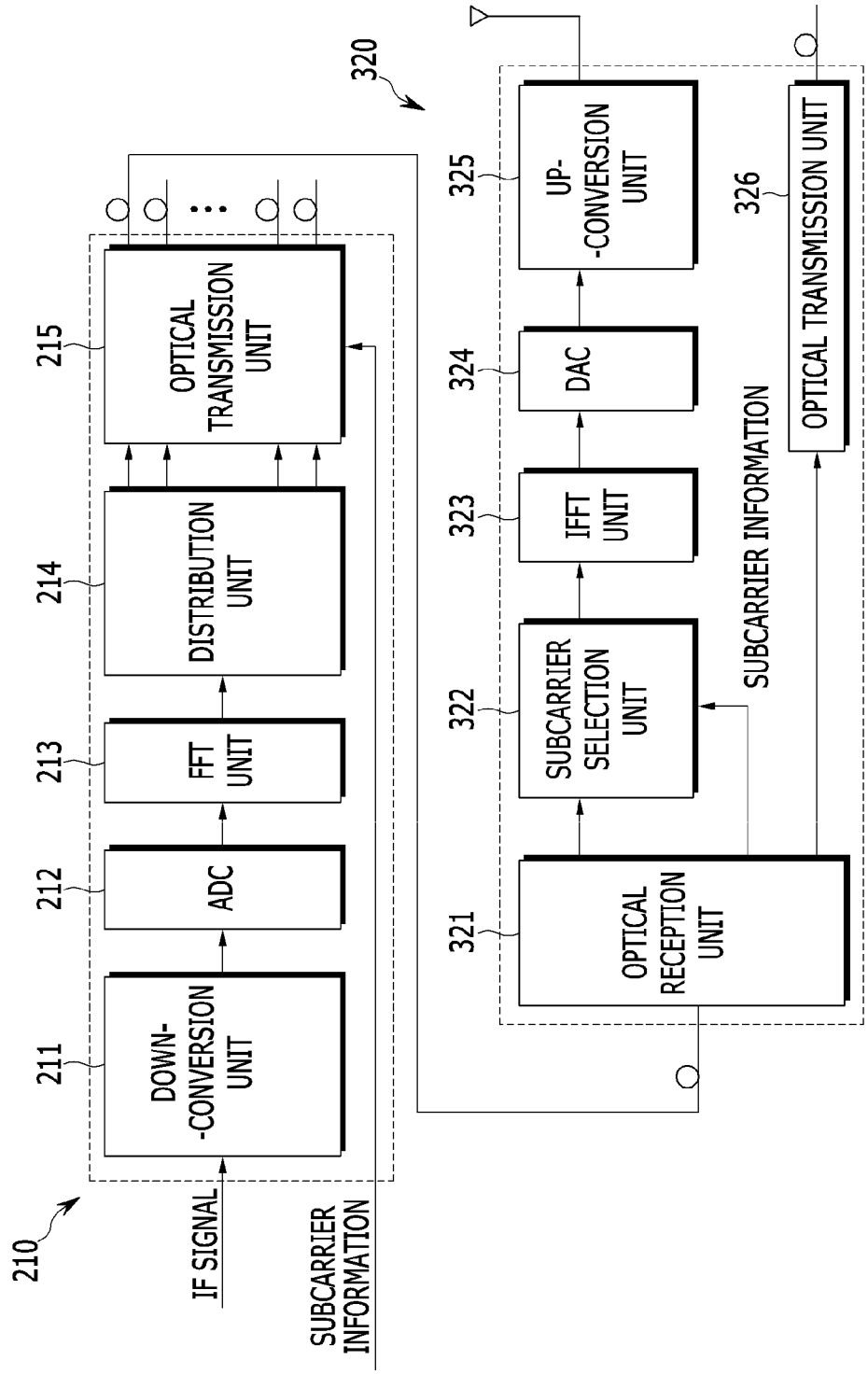
FIG. 4 is a view showing a transmission unit of the MHU and a reception unit of the repeater illustrated in FIG. 3.
Figure 5:
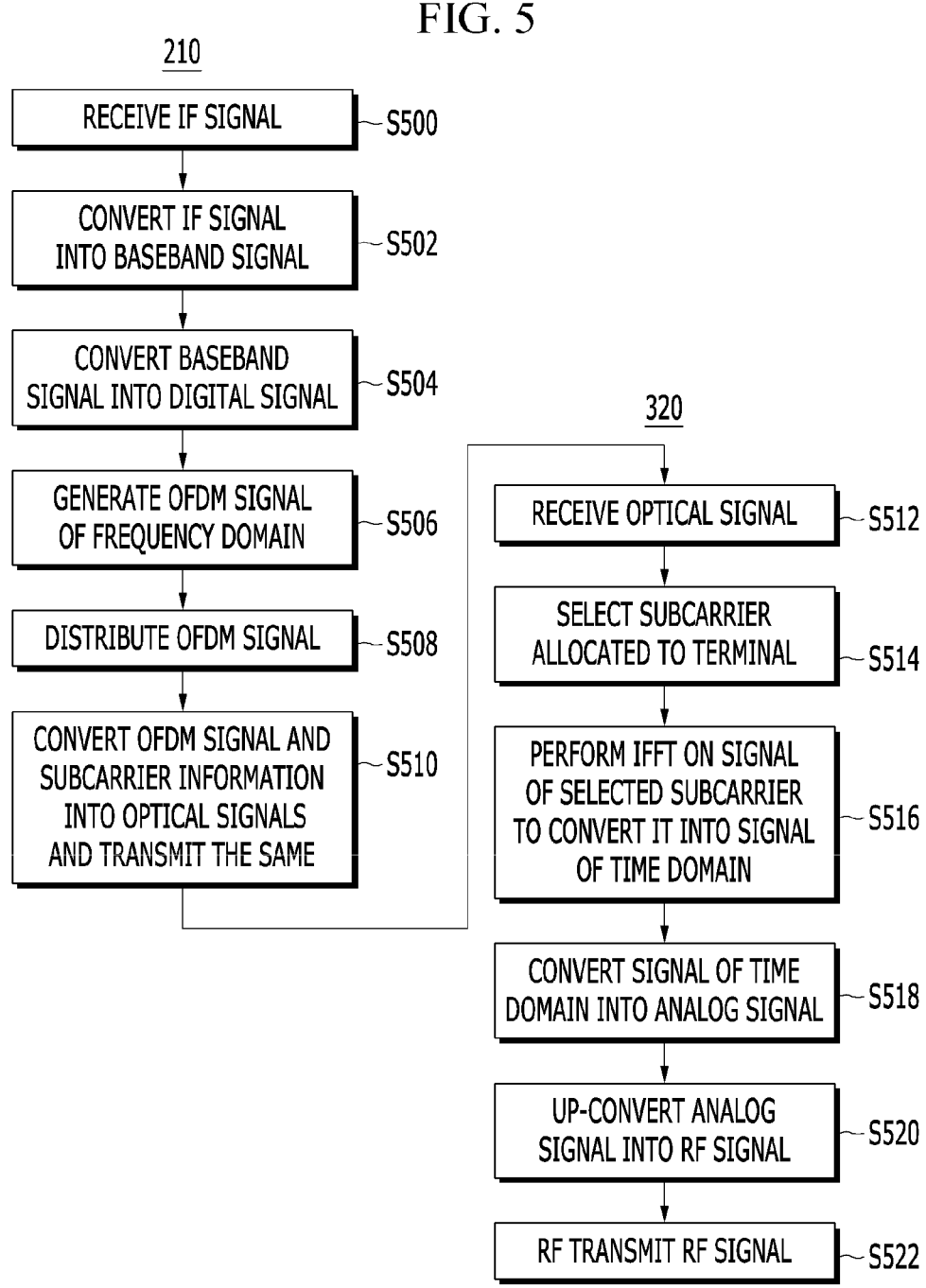
FIG. 5 is a flowchart illustrating a method of performing forward communication between the MHU and the repeater illustrated in FIG. 4.

FIG. 4 is a view showing a transmission unit of the MHU and a reception unit of the repeater illustrated in FIG. 3, and FIG. 5 is a flowchart illustrating a method of performing forward communication between the MHU and the repeater illustrated in FIG. 4.

With reference to FIG. 4, the transmission unit 210 of the MHU 200 includes a down-conversion unit 211, an analog-to-digital converter (ADC) 212, a fast Fourier transform (FFT) unit 213, a distribution unit 214, and an optical transmission unit 215.

Also, the reception unit 320 of the repeater 300 includes an optical reception unit 321, a subcarrier selection unit 322, an inverse FFT unit 323, a digital-to-analog converter (DAC) 324, an up-conversion unit 325, and an optical transmission unit 326.

In forward communication, the BS 100 converts an RF signal desired to be transmitted into an IF signal and transmits the converted IF signal to the MHU 200. Meanwhile, the BS may transmit the RF signal desired to be transmitted, as is, to the MHU 200.

When the MHU 200 receives the IF signal transmitted from the BS 100, the MHU 200 directly matches the received IF signal by using an optical line.

With reference to FIG. 5, when an IF signal matched to an optical signal is received (S500), the down-conversion unit 211 of the MHU 200 converts the IF signal into a baseband signal (S502).

The ADC 212 converts the baseband signal from an analog signal to a digital signal (S504).

The FFT unit 213 of the MHU 200 performs FFT on the digital signal to generate an orthogonal frequency division multiplexing (OFDM) signal of a frequency domain (S506).

The distribution unit 214 of the MHU 200 distributes the OFDM signal according to the number of optical APs (S508).

The optical transmission unit 215 of the MHU 200 converts the OFDM signal distributed to the respective APs into an optical signal and transmits the converted optical signal. The optical transmission unit 215 according to an embodiment of the present invention receives information regarding subcarriers with respect to terminals belonging to the respective repeaters 300 from the BS 100, and the optical transmission unit 215 transmits the information regarding subcarriers with respect to the terminals belonging to the respective repeaters 300 along with the OFDM optical signal (S510).

The BS 100 allocates different subcarriers to the terminals belonging to the respective repeaters 300 such that the respective repeaters 300 can discriminate corresponding signals belonging thereto, and transmits signals to the terminals belonging to the respective repeaters 300 through the subcarriers allocated to the terminals belonging to the respective repeaters 300. Thus, the BS 100 transmits the information regarding the subcarriers allocated to the terminals belonging to the respective repeaters 300 to the optical transmission unit 215 of the MHU 200, and the optical transmission unit 215 of the MHU 200 converts the subcarrier information and the OFDM signal into optical signals, and transmits the optical signals to the repeaters 300.

The optical reception unit 321 of the repeater 300 receives the optical signal from the MHU 200 (S512). The optical reception unit 321 of the repeater 300 converts the optical signal received from the MHU 200 into a digital signal, extracts an OFDM modulation signal and subcarrier information from the digital signal, and transfers the OFDM modulation signal and the subcarrier information to the subcarrier selection unit 322 of the repeater 300.

When the subcarrier selection unit 322 of the repeater 300 receives the OFDM modulation signal and the subcarrier information transferred from the MHU 200, the subcarrier selection unit 322 selects only a subcarrier allocated to the terminal belonging to the repeater 300 among OFDM modulation signal according to the subcarrier information, and transfers the selected subcarrier to the DAC 324 (S514).

The IFFT unit 323 of the repeater 300 converts the OFDM modulation signal corresponding to the subcarrier selected by the subcarrier selection unit 322 into a signal of a time domain through IFFT (S516).

The DAC 324 of the repeater 300 converts the signal of a time domain converted by the IFFT unit 323 from a digital signal to an analog signal (S518).

The up-conversion unit 325 of the repeater 300 up-converts the analog signal into an RF signal (S520), and transmits the RF signal through a repeater antenna (S522).

Also, the optical transmission unit 326 of the repeater 300 transmits the optical signal received from the MHU 200 to an adjacent repeater connected thereto.

In the case of forward communication, since the terminals belonging to the different repeaters receive only a unique subcarrier signal allocated thereto, they do not interfere with each other in forward communication.

Figure 6:
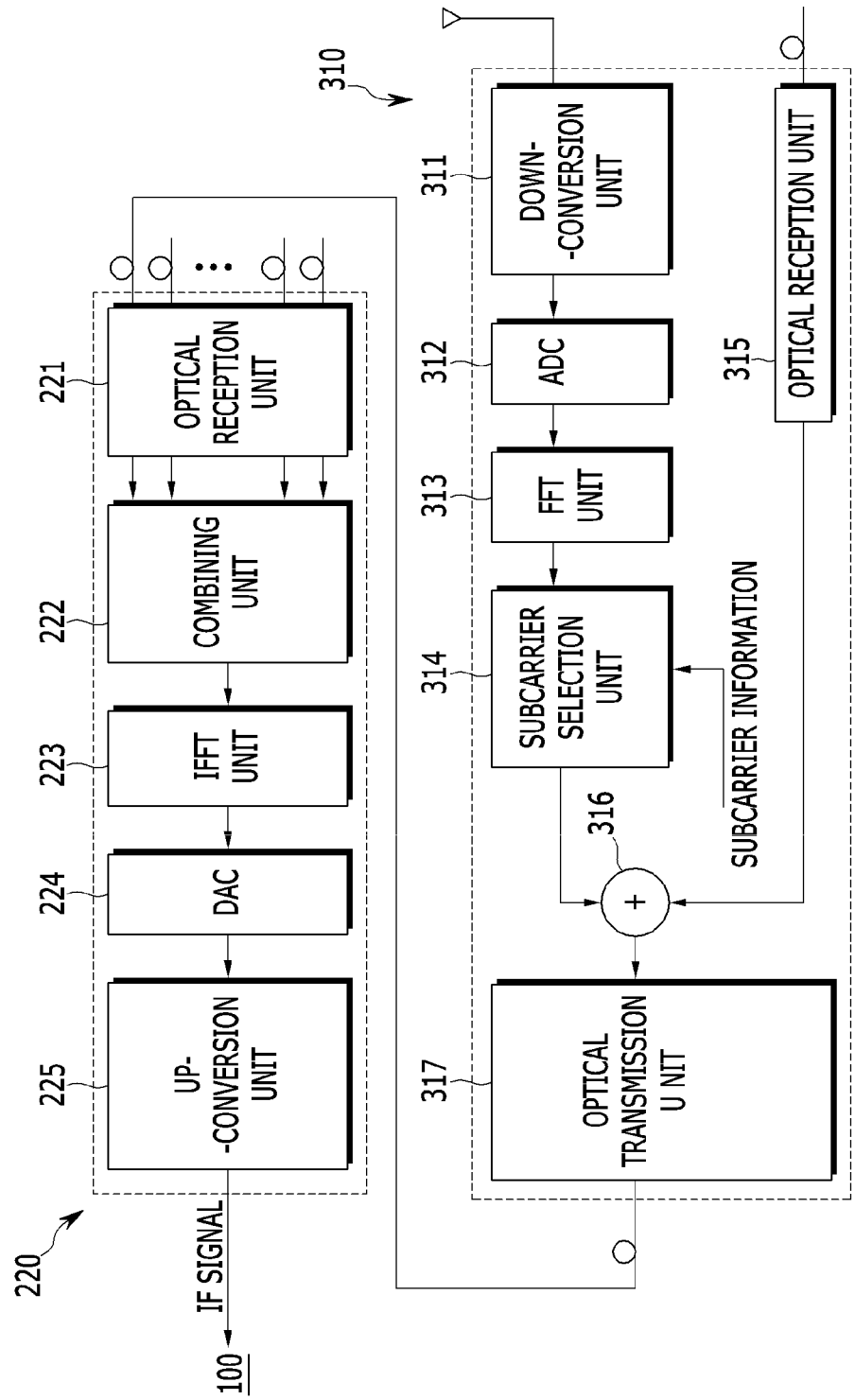
FIG. 6 is a view showing a reception unit of the MHU and a transmission unit of the repeater illustrated in FIG. 3.
Figure 7:
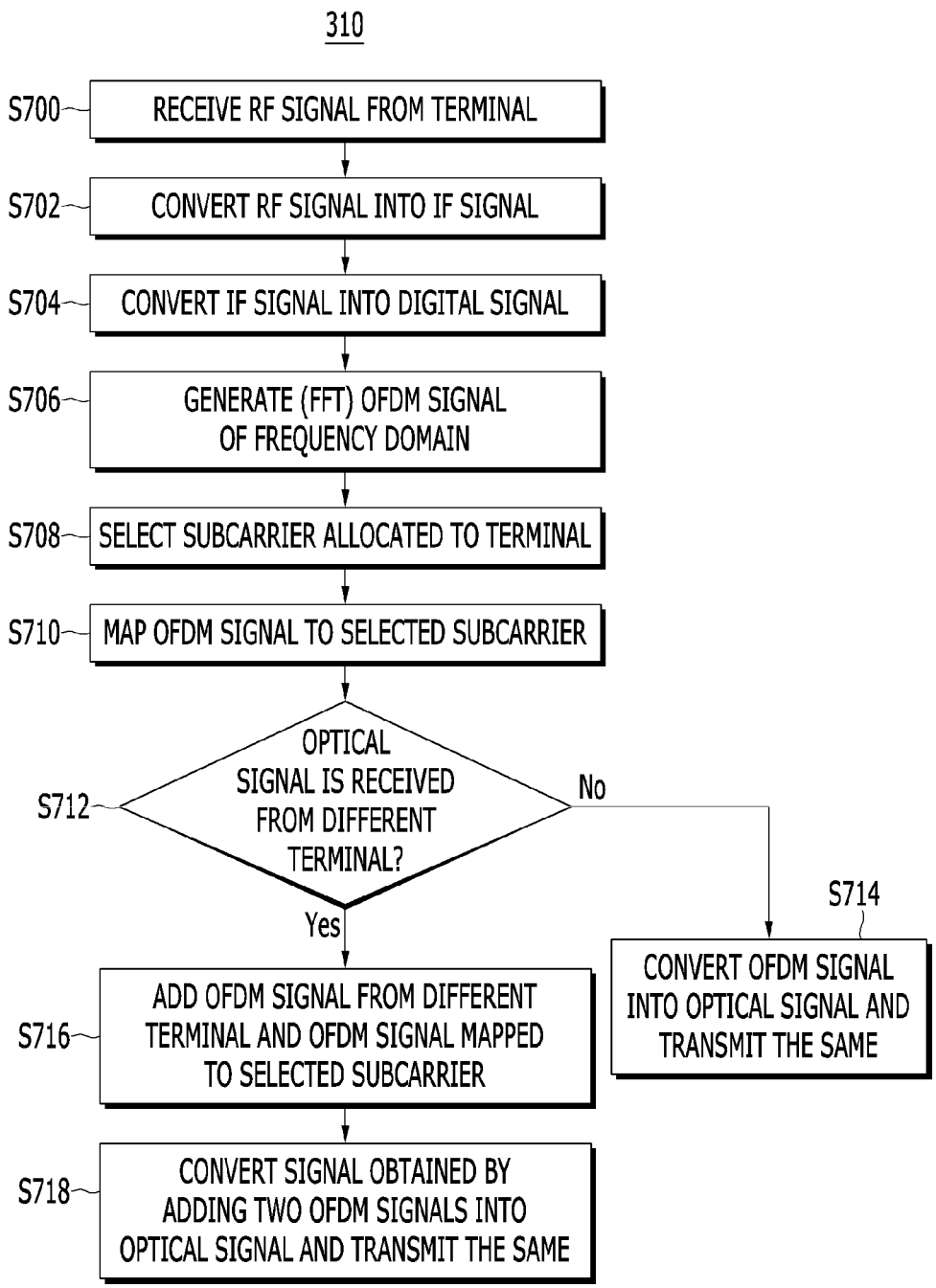
FIGS. 7 and 8 are flowcharts illustrating a method for performing backward communication between the MHU and the repeater illustrated in FIG. 6, respectively.
Figure 8:
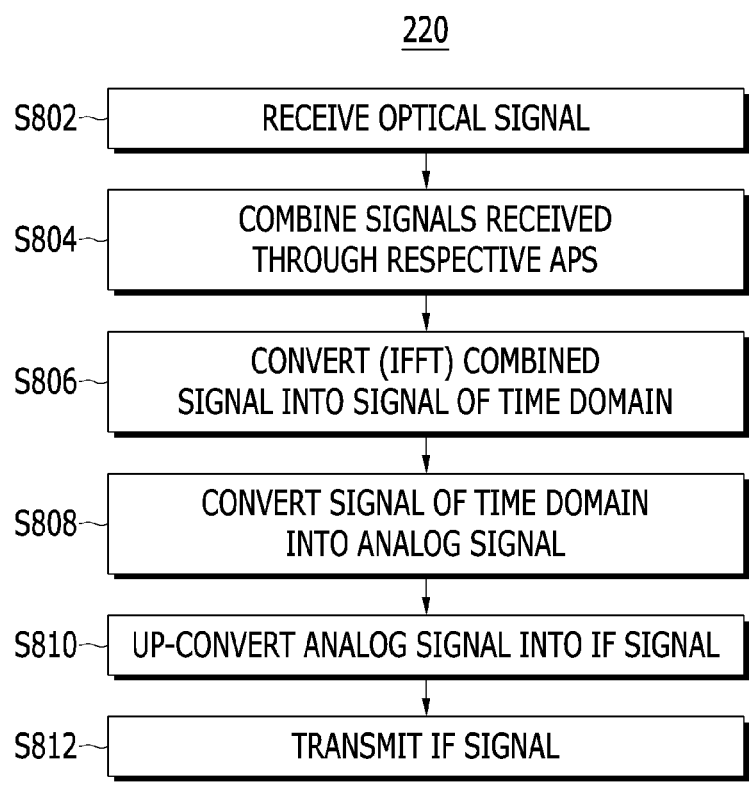
Figure 9:
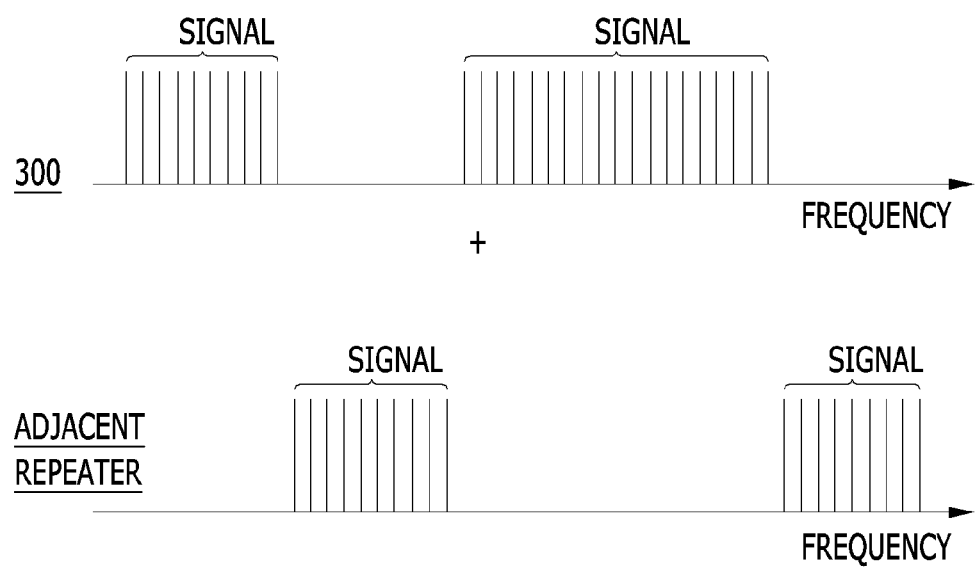
FIG. 9 is a view showing a method for selecting a subcarrier in the repeater illustrated in FIG. 6.

FIG. 6 is a view showing a reception unit of the MHU and a transmission unit of the repeater illustrated in FIG. 3, and FIGS. 7 and 8 are flowcharts illustrating a method for performing backward communication between the MHU and the repeater illustrated in FIG. 6, respectively. FIG. 9 is a view showing a method for selecting a subcarrier in the repeater illustrated in FIG. 6.

With reference to FIG. 6, the transmission unit 310 includes a down-conversion unit 311, an ADC 312, an FFT unit 313, a subcarrier selection unit 314, an optical reception unit 315, a combining unit 316, and an optical transmission unit 317.

Also, the reception unit 220 of the MHU includes an optical reception unit 221, a combining unit 222, an IFFT unit 223, a DAC 224, and an up-conversion unit 225.

With reference to FIG. 7, when an RF signal from a terminal belonging to the repeater 300 is received through a repeater antenna (S700), the down-conversion unit 311 of the repeater 300 down-converts the RF signal into an IF signal (S702).

The ADC 312 of the repeater 300 converts the IF signal from an analog signal to a digital signal (S704).

The FFT unit 313 of the repeater 300 performs FFT on the digital signal to generate an OFDM signal of a frequency domain (S706).

The subcarrier selection unit 314 of the repeater 300 selects a subcarrier allocated to a terminal belonging to the subcarrier selection unit 314, namely, the repeater 300 (S708), and maps an OFDM signal to the selected subcarrier (S710). Namely, the OFDM signal is transmitted through the selected subcarrier.

The optical reception unit 315 receives an optical signal from the adjacent connected repeater, converts the received optical signal into an OFDM signal corresponding to a digital signal, and transfers the converted OFDM signal to the combining unit 316.

The combining unit 316 of the repeater 300 transfers the OFDM signal received from the optical reception unit 315 to the optical transmission unit 317. Then, the optical transmission unit 317 converts the OFDM signal into an optical signal, and transmits the optical signal to the MHU 200 (S714).

Meanwhile, when an optical signal from a different terminal belonging to the adjacent repeater is received from the adjacent repeater (S712), the combining unit 316 of the repeater 300 adds an OFDM signal corresponding to the optical signal from the different terminal received through the adjacent repeater and the OFDM signal mapped to the subcarrier selected by the subcarrier selection unit 314 (S716), and transfers the signal obtained by adding the two signals to the light transmission unit 317.

As shown in FIG. 9, the subcarrier selection unit 315 of the repeater 300 does not use a subcarrier with noise caused by a signal of the adjacent connected repeater as a subcarrier to which the OFDM signal is to be mapped, and the two OFDM signals combined in the combining unit 316 of the repeater 300 do not affect each other. Namely, noise according to multi-hop can be completely canceled.

The optical transmission unit 317 converts the OFDM signal obtained by adding the two OFDM signals into an optical signal, and transmits the optical signal to the MHU 200 (S718).

With reference to FIG. 8, the optical reception unit 221 of the MHU 200 receives an optical signal from the repeater 300 (S802), and converts the received optical signal into a digital signal.

The combining unit 222 of the MHU 200 combines digital signals corresponding to the light signals received from the repeater 300 through the respective APs into a single signal (S804).

The IFFT unit 223 of the MHU 200 converts the combined signal from the combining unit 222 into a signal of a time domain through IFFT (S806).

The DAC 224 of the MHU 220 converts the signal of the time domain from a digital signal to an analog signal (S808).

The up-conversion unit 225 of the MHU 200 up-converts the analog signal into an IF signal (S810), and transmits the IF signal to the BS 100 (S812).

In such backward communication, since the subcarrier selection unit 314 of the repeater 300 excludes a subcarrier of a region in which noise may be present by a signal from an adjacent repeater, as a subcarrier to which an OFDM signal is to be mapped, as shown in FIG. 2, noise according to multi-hop can be completely canceled.

According to an embodiment of the present invention, in the mobile communication system using the multi-hop optical repeating scheme, in forward communication, interference between repeaters can be reduced, and in backward communication, noise generated according to multi-hop can be reduced. Thus, it can be utilized for establishing an effective mobile communication network.

The embodiments of the present invention may not necessarily be implemented only through the foregoing devices and/or methods but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of relaying a signal by a repeater in a mobile communication system based on a multi-hop optical repeating scheme, the method comprising:
   receiving a signal transmitted from a base station and information regarding subcarriers allocated to a plurality of terminals of a region administered by the base station, as optical signals, through a main hub unit (MHU);
   selecting only a subcarrier allocated to a terminal which has accessed the repeater according to the subcarrier information; and
   processing a signal corresponding to the selected subcarrier and transmitting the same to the terminal through an antenna.

2. The method of claim 1, further comprising
   transmitting the optical signals as is to a different repeater adjacent and connected thereto.

3. The method of claim 1, wherein the transmitting comprises performing inverse fast Fourier transform on the signal corresponding to the selected subcarrier to convert the same into a signal of a time domain.

4. The method of claim 3, wherein the transmitting further comprises:
   converting the signal of a time domain from a digital signal to an analog signal; and
   up-converting the analog signal into a radio frequency (RF) signal.

5. The method of claim 1, further comprising:
   mapping a signal from the terminal to a subcarrier allocated to the terminal according to the subcarrier information; and
   converting the signal mapped to the subcarrier into an optical signal and transmitting the converted optical signal to the MHU.

6. The method of claim 5, wherein the mapping comprises performing fast Fourier transform (FFT) on a signal from the terminal to convert it into a signal of a frequency domain.

7. The method of claim 6, wherein the mapping further comprises:
   down-converting the signal from the terminal; and
   converting the down-converted signal from an analog signal to a digital signal.

8. The method of claim 5, further comprising
   receiving an optical signal of a different terminal from a different repeater adjacent and connected thereto,
   wherein the transmitting comprises adding a signal from the different terminal and the signal from the terminal.

9. A method for relaying a signal in a main hub unit (MHU) of a mobile communication system based on a multi-hop optical repeating scheme, the method comprising:
   modulating a signal from a base station;
   receiving information regarding a subcarrier allocated to at least one terminal which has accessed a connected repeater, from the base station; and
   converting the modulated signal and the subcarrier information into optical signals and transmitting the same to the optical repeater.

10. The method of claim 9, wherein the modulating comprises:
    converting the signal from the base station from an analog signal into a digital signal; and
    performing fast Fourier transform (FFT) on the digital signal to convert it into a signal of a frequency domain.

11. The method of claim 9, further comprising:
    receiving a signal from the terminal, as an optical signal, through the repeater; and
    processing the optical signal from the terminal and transmitting the same to the base station.

12. The method of claim 11, wherein the transmitting to the base station comprises:
    performing inverse FFT (IFFT) on a signal from the terminal to convert it into a signal of a time domain;
    converting a signal of the time domain from a digital signal into an analog signal; and
    up-converting the analog signal.

13. An optical repeater in a mobile communication system based on a multi-hop optical repeating scheme, the optical repeater comprising:
    a reception unit configured to receive a modulation signal with respect to a signal transmitted from a base station and information regarding subcarriers allocated to a plurality of terminals of an area administered by the base station, as optical signals, through a main hub unit (MHU), process only a signal of a first subcarrier corresponding to a terminal which has accessed any one repeater according to the subcarrier information of the received optical signal, and transmit the processed signal to the any one repeater; and
    a transmission unit configured to map a signal from the terminal which has accessed the any one repeater to the first subcarrier, convert the signal mapped to the first subcarrier into an optical signal, and transmit the same to the MHU.

14. The optical repeater of claim 13, wherein the transmission unit comprises:
    an optical reception unit configured to receive a signal of a different terminal mapped to a second subcarrier allocated to the different terminal which has accessed an adjacent repeater; and
    an adder configured to combine the signal mapped to the first subcarrier and the signal mapped to the second subcarrier.

15. The optical repeater of claim 13, wherein the reception unit comprises:
    an optical reception unit configured to receive the optical signal and convert the received optical signal into a digital signal;
    a subcarrier selection unit configured to select the signal of the first subcarrier from the digital signal;

an inverse fast Fourier transform (IFFT) unit configured to convert the signal of the first subcarrier into a signal of a time domain through IFFT;

a digital-to-analog conversion unit configured to convert the signal of the time domain into an analog signal; and an up-conversion unit configured to up-convert the analog signal and transmit the same to the terminal which has accessed the any one repeater through an antenna.

16. The optical repeater of claim 13, wherein the transmission unit comprises:

a down-conversion unit configured to down-convert a signal from the terminal;

an analog-to-digital conversion unit configured to convert the down-converted signal into a digital signal;

an FFT unit configured to convert the digital signal into a signal of a frequency domain through FFT;

a subcarrier selection unit configured to map the signal of a frequency domain to the first subcarrier; and an optical transmission unit configured to convert the signal mapped to the first subcarrier into an optical signal.

17. An optical repeater in a mobile communication system based on a multi-hop optical repeating scheme, the optical repeater comprising:

a transmission unit configured to modulate a signal from a base station, convert information regarding a subcarrier allocated to at least one terminal which has accessed a repeater and the modulated signal into optical signals, and transmit the same to the repeater; and a reception unit configured to receive a signal of the terminal, as an optical signal, through the repeater, process the received optical signal, and transmit the processed signal to the base station.

18. The optical repeater of claim 17, wherein the transmission unit comprises:

a down-conversion unit configured to down-convert a signal from the base station;

an analog-to-digital conversion unit configured to convert the down-converted signal into a digital signal;

an FFT unit configured to convert the digital signal into a signal of a frequency domain through FFT; and an optical transmission unit configured to convert the signal of a frequency domain into an optical signal and transmit the converted optical signal to the repeater.

19. The optical repeater of claim 18, wherein the optical transmission unit receives the subcarrier information from the base station and converts the signal of a time domain and the subcarrier information into the optical signals.

20. The optical repeater of claim 17, wherein the reception unit comprises:

an optical reception unit configured to receive the optical signal through the repeater and convert the received optical signal into a digital signal;

an IFFT unit configured to convert the digital signal into a signal of a time domain through IFFT;

a digital analog conversion unit configured to convert the signal of a time domain into an analog signal; and an up-conversion unit configured to up-convert the analog signal and transmit the up-converted signal to the base station.

\* \* \* \* \*